(Model.)
L. M. DEVORE.
SPRING HINGE.
No. 326,956. Patented Sept. 29, 1885.
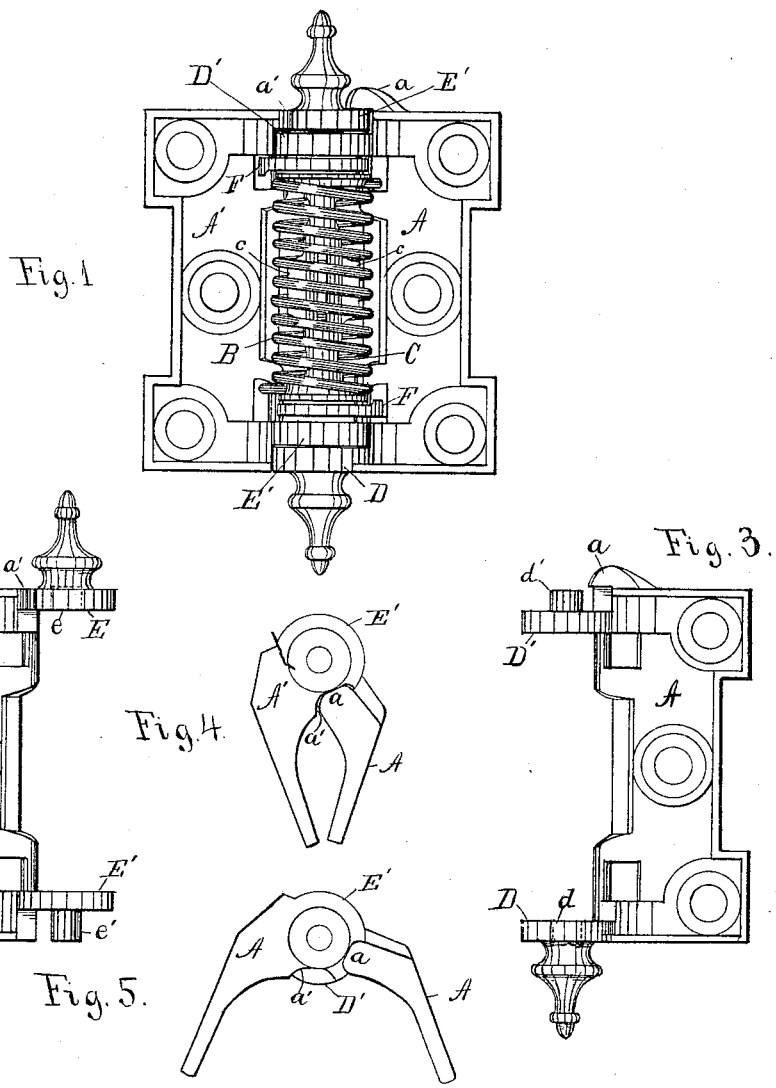
Witnesses:
E. L. Thurston
Chas. S. Weaver
Inventor:
Levi M. Devore
by Hill & Dixon
his attorneys

UNITED STATES PATENT OFFICE.

LEVI M. DEVORE, OF FREEPORT, ILLINOIS, ASSIGNOR TO THE FREEPORT SPRING HINGE COMPANY, OF SAME PLACE.

SPRING-HINGE.

SPECIFICATION forming part of Letters Patent No. 326,956, dated September 29, 1885.

Application filed March 25, 1885. (Model.)

*To all whom it may concern:*

Be it known that I, LEVI M. DEVORE, of the city of Freeport, in the county of Stephenson and State of Illinois, have invented certain new and useful Improvements in Spring-Hinges, of which the following is a description, reference being had to the accompanying drawings, in which—

Figure 1 is a plan view of my improved hinge. Figs. 2 and 3 are plan views of the two leaves thereof. Fig. 4 is an end view of the two leaves in the relative positions necessary to couple them together. Fig. 5 is an end view of the two leaves coupled together, and Fig. 6 is a plan view of the arbor about which the spring is coiled.

Like letters of reference represent the same parts in the several figures.

The objects of my invention are to provide a spring-hinge wherein the two leaves may be securely pivoted together without the use of rivets in such a manner that the hinge shall answer equally well as a right or left hand hinge—in other words, a spring-hinge, the leaves of which are so connected that the door may be attached at will to either leaf and still have no weight forced upon or supported by the arbor about which the spring is coiled—and, also, wherein the leaves shall be so coupled together that when in a working position they cannot be separated; also, to provide means in a spring-hinge whereby the tendency of the spring, when the same is twisted by the motion of the hinge, to bend at or near its center out of the straight line shall be counteracted and the spring always maintained in the line of its axis even when twisted to its fullest extent by the hinge.

To this end it consists in the construction and combination of parts herein fully described, and definitely pointed out in the claims.

In the drawings, A A' represent the right and left hand leaves of the hinge, respectively. B represents the spring, and C the arbor about which the spring is coiled. The form of spring-hinge shown is that in which, when the leaves are swung, the spring moves independently of the axis of the pintles and acts to close the door to which the hinge is attached during a part of its movement, and to open it during the rest of its movement or when it shall have passed what may be termed the "dead-point." The spring, as illustrated in the drawings, is attached at each end thereof directly to opposite leaves of the hinge, and indirectly to opposite leaves by means of the links F, which are pivotally connected to the arbor C; but I do not desire or intend to limit myself to this precise style of spring-hinge, since it is plain that my improvement is equally applicable to other styles of spring-hinges.

D D' and E E' represent ears attached at opposite ends to the leaves A A', respectively, which ears are raised somewhat above the level of said leaves. $e'$ and $d'$ represent the pintles of the hinge, made integral with the ears E' and D', respectively. The dotted lines at $e$ and $d$ represent holes in the ears E and D, forming sockets, and in these sockets the pintles $d'$ and $e'$ pass and operate.

Upon the upper edge of the leaf A, and integral with said leaf, is the lug or short arm $a$, which extends a short distance over the ear D'. Into the upper ear, E, upon the leaf A', the slot $a'$ is cut or cast, as shown most clearly in Figs. 4 and 5.

When, now, it is desired to unite the leaves they are brought into the relative positions shown in Fig. 4, with their outward faces close together, the pintles $d'$ and $e'$ enter the sockets $e$ and $d$, respectively, and at the same time the lug $a$ passes through the slot $a'$. The leaves are then swung upon their pintles, thus, as clearly shown both in Figs. 1 and 5, locking the leaves securely together. The pintles prevent any side motion, while up and down motion is prevented by the position of the ear E between the ear D' and lug $a$. Any weight applied to the leaf A' is supported upon the ears D D'. Any weight applied to the leaf A is supported by the lug $a$ resting upon the ear E. In both cases the arbor C supports no weight; and as it is evident that when the hinge is applied to a door the leaves can never assume the relative positions shown in Fig. 4, it follows that the leaves cannot be detached when in a working position.

The arbor C, as shown in Fig. 6, has longitudinal ribs $c\ c$, &c., radiating therefrom. These ribs are of such a height that the arbor C will pass freely within the spring B when the same is in its normal position, as shown in Fig. 1; but when the spring is contracted by the twisting caused by the operation of the hinge the outer edges of the ribs c c, &c., just touch the inner surface of the spring.

The function performed by the arbor C, thus constructed with the longitudinal ribs c c, &c., may be explained as follows: When the spring is contracted by torsion the tendency is to relieve itself by bending out of the line of its axis at or near the middle of the spring, and this is noticeable to a greater or less extent in all spring-hinges now in use; but by this construction this bending is prevented and the full force of the spring is secured to operate the hinge, because the axis of the arbor is and continues to be, in all positions of the hinge, the axis of the spring, and the ribs c c, &c., abut against the inner surface of the spring when contracted, and the said spring is therefore restrained from bending, and retained always in the line of its axis.

It is obvious that other inferior but equivalent forms may be used in place of the ribs, as shown. For instance, the ribs might be filled in solid, or a spiral rib might be applied to the arbor. The advantage of the form shown in the drawings is the small amount of metal employed in its construction.

Having thus described my invention, what I claim as new, and desire to secure by Letters Patent, is—

1. A spring-hinge, each leaf of which has an ear upon opposite ends thereof and a pintle and socket integral with said ears upon each leaf at opposite ends thereof, one leaf having a lug upon one end slightly overhanging the ear upon said end, and the other leaf having the adjacent ear slotted, substantially as and for the purpose set forth.

2. In a spring-hinge, an arbor about which the spring is coiled provided with longitudinal ribs near its center, substantially as and for the purpose set forth.

LEVI M. DEVORE.

Witnesses:
M. STOSKOPF,
LEONARD STOSKOPF.